(12) United States Patent
Wu et al.

(10) Patent No.: US 7,603,663 B2
(45) Date of Patent: Oct. 13, 2009

(54) APPARATUS AND METHODS FOR RESTORING SYNCHRONIZATION TO OBJECT-ORIENTED SOFTWARE APPLICATIONS IN MANAGED RUNTIME ENVIRONMENTS

(75) Inventors: Gansha Wu, Beijing (CN); Guei-Yuan Lueh, San Jose, CA (US); Xiaohua Shi, Beijing (CN)

(73) Assignee: Intel Corporation, Santa Clara, CA (US)

( * ) Notice: Subject to any disclaimer, the term of this patent is extended or adjusted under 35 U.S.C. 154(b) by 595 days.

(21) Appl. No.: 10/441,357

(22) Filed: May 20, 2003

(65) Prior Publication Data

US 2004/0237073 A1 Nov. 25, 2004

(51) Int. Cl.
G06F 9/45 (2006.01)
G06F 9/44 (2006.01)
(52) U.S. Cl. .................. 717/151; 717/159; 717/166
(58) Field of Classification Search .............. 717/135, 717/166
See application file for complete search history.

(56) References Cited

U.S. PATENT DOCUMENTS

| 6,671,707 B1* | 12/2003 | Hudson et al. | 707/206 |
| 7,058,929 B2* | 6/2006 | Charnell et al. | 717/135 |
| 2002/0049865 A1* | 4/2002 | Charnell et al. | 709/315 |

OTHER PUBLICATIONS

"Escape analysis for object-oriented languages: application to Java", B. Blanchet, Dec. 1999, pp. 1-15. Online retrieved at <http://delivery.acm.org/10.1145/330000/320387/p20-blanchet.pdf>.*

"Effective synchronization removal for Java", E. Ruf, Dec. 2000, pp. 208-218. Online retrieved at <http://delivery.acm.org/10.1145/350000/349327/p208-ruf.pdf>.*

Whaley, J; Rinard, M. "Compositional Pointer and Escape Analysis for Java Programs." Proceedings of the 14th Annual ACM SIGPLAN Conference on Object-Oriented Programming Systems, Languages, and Applications. Denver, CO, Nov. 1999. pp. 187-206.

Bogda, J; Holzle, U. "Removing Unnecessary Synchronization in Java." Proceedings of the 14th Annual ACM SIGPLAN Conference on Object-Oriented Programming Systems, Languages, and Applications. Denver, CO, Nov. 1999. pp. 35-46.

Ruf, E. "Effective Synchronization Removal for Java." ACM SIGPLAN Conference on Programming Language Design and Implementation (PLDI'2000). Vancouver, British Columbia, Canada, 2000. pp. 208-218.

Choi, J; Gupta, M; Serrano, M; Sreedhar, V; Midkiff, S. "Escape Analysis for Java." Proceedings of the 1999 ACM SIGPLAN conference on Object-oriented programming, systems, languages, and applications. Denver, CO, Nov. 1999. pp. 1-19.

*Written Opinion of the International Searching Authority*, Dec. 10, 2004, 6 sheets.

*International Search Report*, Dec. 10, 2004, 3 sheets.

* cited by examiner

*Primary Examiner*—Tuan Q Dam
*Assistant Examiner*—Thuy Dao
(74) *Attorney, Agent, or Firm*—Hanley, Flight & Zimmerman, LLC

(57) ABSTRACT

An example apparatus and method described herein involves determining if a class object has been dynamically loaded, performing an escape analysis on the program code and determining if assumptions made during an initial escape analysis are valid. Additionally, the example apparatus and method restore synchronization to at least a portion of the program code affected by loading of the class object if the assumptions made during the initial escape analysis are no longer valid.

33 Claims, 8 Drawing Sheets

```
Class Class1 {
        public static Class1 global;
        void do_nothing(Class1 obj) {}
        void synchronized foo() {
                global.do_nothing(this);
                ... ...
        }
}// Class1 void caller() {
        Class1 obj = new Class1();
        ... ...
        //call site A - synchronization removed
        obj.foo();
}
```

FIG. 2

```
Class Class2 extends Class1 {
        void do_nothing(Class1 obj) {
        global = obj; //escape thread
        }
} //Class2 void caller() {
        Class1 obj = new Class1();
        ... ...
        //call site A - synchronization removal invalid
        obj.foo();
}
```

FIG. 3

```
//DS is a set of <caller, call_site> provided by escape analysis
re-synchronize_one_thread (thread, DS) {
        current_frame = current context of thread;
        while (current_frame is not bottom frame) {
                D= {<x,y>|<x,y> is a member of DS and current_frame.method ==x}
                for each <x.y> in D {
                        z = callee_of(<x,y>);//get the callee of call site y
                        if (last_frame.method == z)
                                compensate_lock_unlock(z);
                }
                last_frame = current_frame;
                current frame = unwind_to_next_frame();
        }
}
```

FIG. 6

```
Static Class1 bar1() {
        return new Class1();
} void caller1(){
        ... ...
        Class1 obj = bar1();
        //after escape analysis it is known that obj is of Class1 type
        obj.do_nothing();

... ...
        //call site B - synchronization removal still valid
        obj.foo();
}
```

FIG. 7

```
unwind_to_next_frame(current_frame) {
        return_address = current_frame.return_address;
        //what is return_address is in fact stub_address?
        //FAIL the following steps, so if FAIL
        if (*(return_address -1) == COMP_UNLOCK_TAG {
                return_address = *(return_address -2); //real return address
        }
        ... ...
}
```

FIG. 10

APPARATUS AND METHODS FOR RESTORING SYNCHRONIZATION TO OBJECT-ORIENTED SOFTWARE APPLICATIONS IN MANAGED RUNTIME ENVIRONMENTS

FIELD OF THE DISCLOSURE

The present disclosure relates generally to managed runtime environments and, more specifically, to apparatus and methods for restoring synchronization to object-oriented software applications in managed runtime environments.

BACKGROUND

The need for increased software application portability (i.e., the ability to execute a given software application on a variety of platforms having different hardware, operating systems, etc.), as well as the need to reduce time to market for independent software vendors (ISVs), have resulted in increased development and usage of managed runtime environments.

Managed runtime environments are typically implemented using a dynamic programming language such as, for example, JAVA—a registered mark of Sun Microsystems, Inc., C#, etc. A software engine (e.g., a Java Virtual Machine (JVM), Common Language Runtime (CLR), etc.), which is commonly referred to as a runtime environment, executes the dynamic program language instructions. The runtime environment interposes or interfaces between dynamic program language instructions (e.g., a JAVA program or source code) to be executed and the target execution platform (i.e., the hardware and operating system(s) of the computer executing the dynamic program) so that the dynamic pro-ram can be executed in a platform independent manner.

Dynamic program language instructions (e.g., JAVA instructions) are not statically compiled and linked directly into native or machine code for execution by the target platform (i.e., the operating system and hardware of the target processing system or platform). Instead, dynamic program language instructions are statically compiled into an intermediate language (e.g., bytecodes) and the intermediate language may interpreted or subsequently compiled by a just-in-time (JIT) compiler into native or machine code that can be executed by the target processing system or platform. Typically, the JIT compiler is provided by a runtime environment that is hosted by the operating system of a target processing platform such as, for example, a computer system. Thus, the runtime environment and, in particular, the JIT compiler, translates platform independent program instructions (e.g., JAVA bytecodes, C# bytecodes, etc.) into native code (i.e., machine code that can be executed by an underlying target processing system or platform).

To improve overall productivity, many dynamic programming languages and their supporting managed runtime environments provide infrastructure that enables concurrent programming techniques such as, for example, multi-threading to be employed. In particular, many dynamic programming languages provide synchronization features or operations that enable multiple concurrent threads of execution to share or access a given object and its variables without causing a conflict or contention. For example, in the case of a globally accessible object (i.e., a public object), the software designer typically assumes that conflict or contention can occur during runtime and includes appropriate synchronization operations within the object to prevent such a conflict or contention. In this manner, the software designer can guarantee that the globally accessible object is "thread safe" (i.e., can be employed in a multi-threading runtime environment without conflicts or contention).

Unfortunately, the processing overhead associated with object synchronization results in a significant reduction in execution time. For example, in the case of some well-known JAVA applications and benchmarks, synchronization overhead may consume between about ten to twenty percent of overall execution time. Furthermore, synchronization is usually employed as a safeguard to prevent contentions during runtime (particularly in the case of object libraries), regardless of whether such synchronization is actually required during runtime.

Known escape analysis techniques can be used to increase the overall execution speed of code including unnecessary synchronization. In general, known escape analysis techniques employ a whole program analysis that enables the removal of synchronization operations associated with non-global objects and global objects for which there will be no contention during runtime execution of the program. Known escape analysis techniques are based on a statically linked code model that assumes that no new classes of objects will be loaded during runtime. However, some popular programming languages such as, for example, JAVA and CLI (Common Language Infrastructure), provide a dynamic class loading feature that allows dynamic linking of methods or functions that are about to be called within a runtime context. In some cases, loading a class dynamically into a runtime environment that is executing a previously optimized program (e.g., a program from which synchronization has been removed in whole or in part), can cause the program to behave in an unsafe manner (e.g., data contention) or fail. While known escape analysis techniques based on a statically linked code model can be used to remove synchronization from statically linked code, these known techniques do not support the restoration of synchronization to previously desynchronized (i.e., optimized) code that subsequently requires synchronization due to the effects of a dynamically loaded class. Additionally, other open world features such as, for example, reflection and native methods can invalidate an escape analysis, thereby leading to unsafe execution conditions.

BRIEF DESCRIPTION OF THE DRAWINGS

FIG. 2 illustrates example JAVA-based code associated with a class for which synchronization has been removed following an escape analysis.

FIG. 3 illustrates example JAVA-based code for another class that invalidates the synchronization removal for call site A if loaded dynamically.

FIG. 6 is example pseudo-code depicting one manner in which the just-in-time compiler shown in FIG. 1 may be configured to perform lock/unlock compensation for each thread associated with an impacted call site.

FIG. 7 illustrates example JAVA-based code for which synchronization removal remains valid despite the dynamic loading of a class associated with the call site A.

FIG. 10 is example code depicting one manner in which the cookie COMP_UNLOCK_TAG may be used to recover a return address in a stack unwinding context.

DETAILED DESCRIPTION

Figure 1:
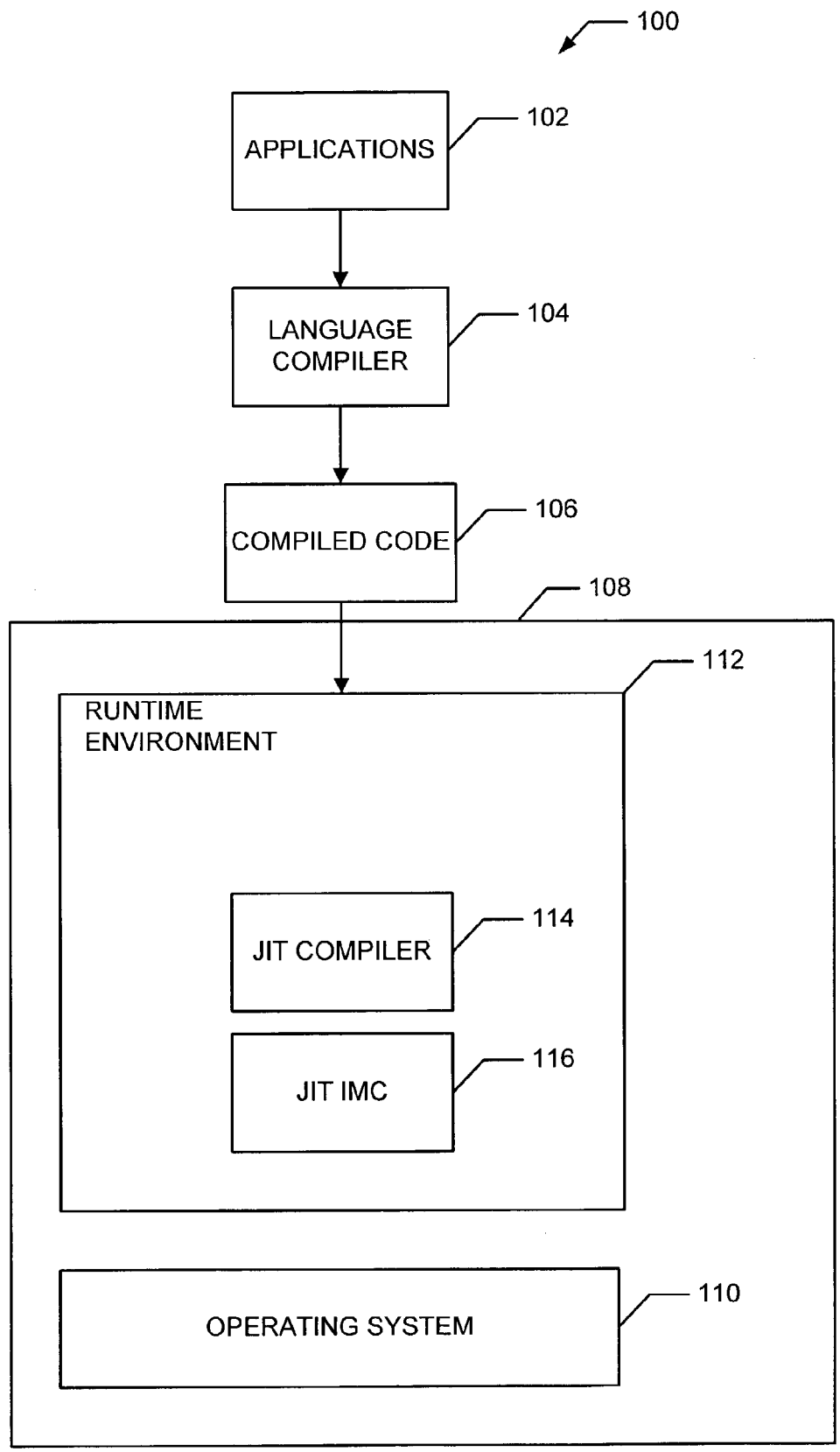
FIG. 1 is a block diagram of an example architecture that may be used to implement the synchronization restoration apparatus and methods described herein.

FIG. 1 is a block diagram of an example architecture 100 that may be used to implement the synchronization restoration apparatus and methods described herein. For the example architecture 100, one or more software applications 102, which are composed of one of more dynamic programming languages and/or instructions, are provided to a language compiler 104. The applications 102 may be written using a platform independent language such as, for example, JAVA or C#. However, any other dynamic or platform independent computer language or instructions could be used instead. In addition, some or all of the applications 102 may be stored within the system on which the applications are to be executed. Additionally or alternatively, some or all of the applications may be stored on a system that is separate (and possibly remotely located) from the system on which the applications 102 are to be executed.

The language compiler 104 statically compiles one or more of the applications 102 to generate compiled code 106. The compiled code 106 is intermediate language code or instructions (e.g., bytecodes in the case where the complied application(s) are written in JAVA) that is stored in a binary format in a memory (not shown). As with the applications 102, the compiled code 106 may be stored locally on a target system 108, on which the compiled code 106 is to be executed. The target system 108 may be a computer system or the like such as that described in greater detail below in connection with FIG. 11. The target system 108 may be associated with one or more end-users or the like. Additionally or alternatively, the compiled code 106 may be delivered to the target system 108 via a communication link or links including, for example, a local area network, the Internet, a cellular or other wireless communication system, etc.

One or more portions of the compiled code 106 (e.g., one or more software applications) may be executed by the target system 108. In particular, an operating system 110 such as, for example, WINDOWS, LINUX, etc., hosts a runtime environment 112 that executes one or more portions of the compiled code 106. For example, in the case where the compiled code 106 includes JAVA bytecodes, the runtime environment 112 is based on a Java Virtual Machine (JVM) or the like that executes JAVA bytecodes. The runtime environment 112 loads one or more portions of the compiled code 106 (i.e., the intermediate language instructions or code) into a memory (not shown) accessible by the runtime environment 112. Preferably, the runtime environment 110 loads an entire application (or possibly multiple applications) into the memory and verifies the compiled or intermediate language code 106 for type safety.

After the application or multiple applications are loaded into memory by the runtime environment 112, the intermediate language instructions associated with methods or objects called by the application being executed or otherwise needed to execute the application may be processed by a just-in-time (JIT) compiler 114. The JIT compiler 114 compiles the intermediate language instructions to generate native or machine code that is executed by one or more processors (such as, for example, the processor 1122 shown in FIG. 11) within the computer system 108.

The JIT compiler 114 may store native code (i.e., machine code compatible with and, thus executable by, the computer system 108) in a JIT in-memory cache (JIT IMC) 116. In this manner, the runtime environment 112 can re-use native code associated with a previously compiled method that is invoked or called more than once. In other words, intermediate language instructions compiled into native code and stored in the JIT IMC 116 can be re-used and executed multiple times by the runtime environment 112.

Although the JIT IMC 116 is depicted as being implemented within the runtime environment 112, other configurations for the JIT IMC 116 are possible. For example, the JIT IMC 116 could be part of another data structure within other runtime modules, sessions or environments (not shown) hosted by the operating system 110. In other examples, particularly those involving virtual calls, the JIT IMC 116 may be implemented so that native code associated with methods to be called is stored in well-known data structure such as, for example, virtual dispatch tables.

In general, dynamic programming languages such as, for example, JAVA, provide two types of synchronization to enable software designers to generate thread-safe code or software objects. A synchronized software object can only be accessed by one execution thread at a time, thereby preventing a conflict or contention associated with parameters or variables used by the object from occurring. In other words, global objects and other objects accessible by more than one execution thread can be made thread safe by introducing software lock and unlock mechanisms that prevent more than one thread from simultaneously accessing the objects. One such type of synchronization enables a block of code (i.e., one or more statements) to be synchronized. Another such type of synchronization enables a method (i.e., a call to a block of code) to be synchronized.

Dynamic programming languages typically provide both high level or language level synchronization statements and low level or managed runtime level primitives for purposes of synchronizing code blocks and methods. For example, in the case of JAVA, the keyword "synchronized" is used at the language level (i.e., high level) to declare a block or method to be protected by synchronization. In addition, in the case of JAVA, the Low level or managed runtime primitives corresponding to the language level keyword "synchronized" are "monitorenter" and "monitorexit." However, for purposes of simplifying the following discussion, low level synchronization primitives will be referred to as "lock" and "unlock" and the high level or language level synchronization statements will be referred to using the keyword "synchronized,"

As noted above, known escape analysis techniques typically employ a whole program analysis that is based on the assumption that additional object classes will not be loaded once program execution has started (i.e., during runtime). In particular, the algorithms used to perform the escape analysis may use context-sensitive approaches that perform inter-procedural analysis of a compiled program to determine whether arguments passed to callees (e.g., called methods, objects, etc.) are assigned to static variables. Such whole program or inter-procedural analyses are based on the assumption that new object classes will not be loaded during runtime and are commonly referred to as closed-world analyses. Such closed-world analyses can often result in aggressive optimization of synchronized code. In other words, all synchronization operations associated with non-global objects and global objects without contention at the time of such a closed-world analysis can be eliminated, thereby significantly increasing the rate at which the code can be executed by the JIT compiler 114.

The synchronization restoration apparatus and methods described herein enable a managed runtime environment (e.g., a JVM environment) to just-in-time compile code that has initially been optimized to aggressively remove synchronization operations based on an assumption that new classes will not be dynamically loaded (i.e., loaded during runtime). Thus, the initial optimization (i.e., desynchronization) may be based on a conventional or known escape analysis that performs a closed-world type analysis resulting in the removal of synchronization operations associated with, for example, global objects without contention or non-global objects. However, in contrast to known techniques, the synchronization restoration apparatus and methods described herein can be used in a dynamic class loading context. In particular, the resynchronization apparatus and methods described herein enable a JIT compiler (e.g., the JIT compiler 114) to determine if a newly loaded class changes the behavior of a program currently being executed in a manner that invalidates the optimization decisions (e.g., synchronization operation removals) made during an initial closed-world type escape analysis. In other words, when the JIT compiler 114 encounters a newly loaded class during runtime or execution of the program or code that it is currently processing, an escape analysis of the whole program, including the newly loaded class, is performed and synchronization operations are restored to the code or program as needed to prevent conflicts or contentions between multiple execution threads. As described in greater detail below, the synchronization restoration apparatus and methods described herein can restore synchronization to (patch synchronization back into) call sites that have previously been desynchronized as a result of an initial closed-world escape analysis. In addition, the synchronization restoration apparatus and methods described herein also analyze runtime contexts and generate compensation code such as, for example, lock and unlock operations to maintain proper synchronization semantics.

To provide a better understanding of an example situation in which a class added dynamically (i.e., added during runtime execution of a program) can invalidate the results of an initial closed-world type escape analysis, example JAVA-based code is provided in FIGS. 2 and 3. In particular, FIG. 2 depicts example JAVA-based code for which synchronization may be removed from call site A during an initial closed-world type escape analysis of the code shown in FIG. 2. More specifically, synchronization can be removed from the call site A because, at least initially, "obj" does not escape the method "caller." In other words, "obj" is not accessible or available to an execution thread outside the execution thread currently executing the method "caller." As a result, a synchronized version of "foo" may be replaced following an initial closed-world type of escape analysis with an unsynchronized version of "foo."

FIG. 3 depicts example JAVA-based code that includes a new class "Class2" that is derived from "Class1." IF, while the program containing the code shown in FIG. 2 is being executed, the object "Class2" is dynamically loaded, the public static field "global" defined in Class1 may also be an instance of Class2. Thus, because the virtual method "do_nothing" within Class2 assigns "obj" to "global," "obj" becomes available to multiple execution threads (i.e., escapes the thread). As a result, the removal of synchronization at the call site A is no longer valid and continued operation of the program may require resynchronization of the code associated with the call site A.

Figure 4:
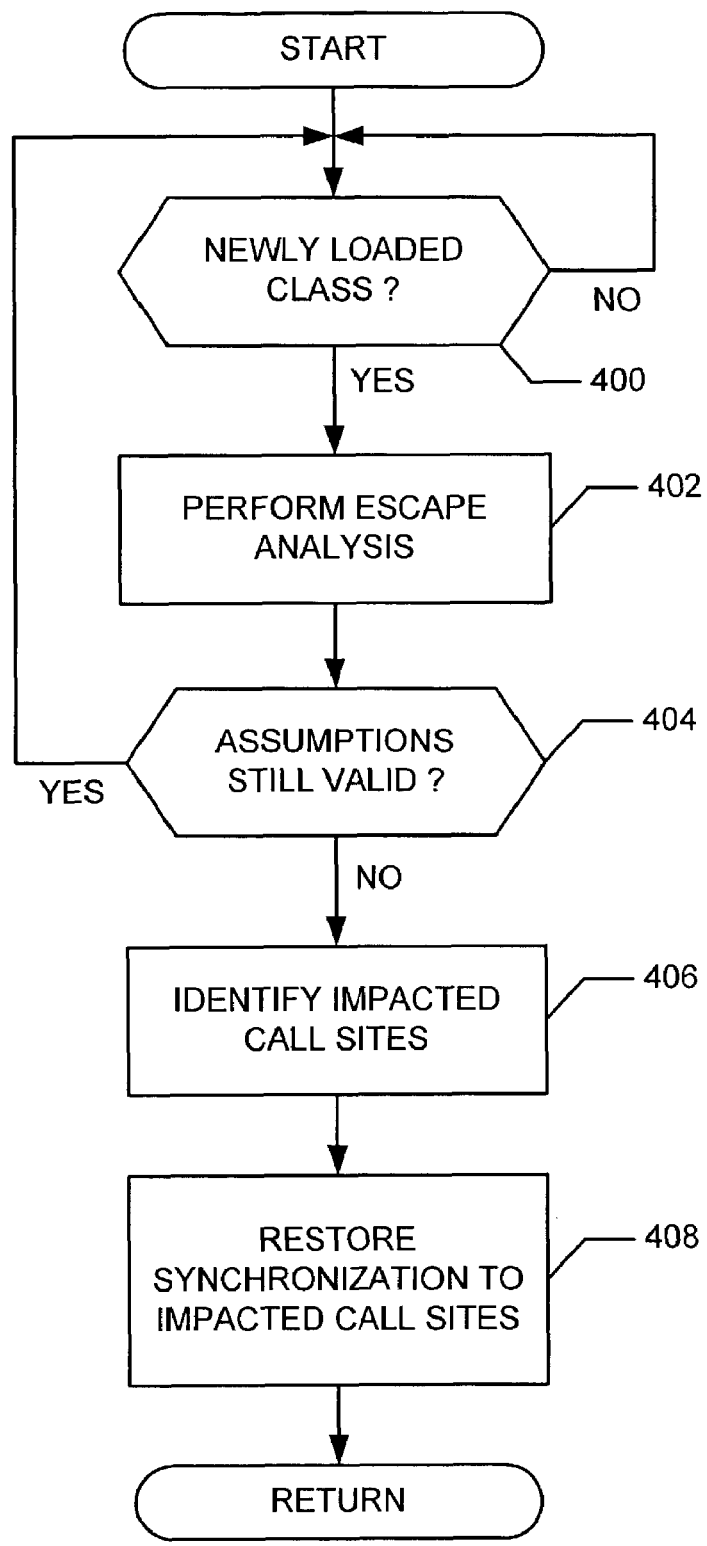
FIG. 4 is flow diagram of an example manner in which the just-in-time compiler shown in FIG. 1 may be configured to restore synchronization to call sites impacted by a dynamically loaded class.

FIG. 4 is flow diagram of an example manner in which the just-in-time compiler 114 shown in FIG. 1 may be configured to restore synchronization to or resynchronize call sites impacted by a dynamically loaded class such as, for example, the Class2 as described above in connection with FIGS. 2 and 3. Initially, the runtime environment 112 determines if some open world features (e.g., a new class is loaded (block 400)) occur and will potentially undermine or invalidate the previously made desynchronization decision. If the JIT compiler 114 determines that there is not a newly loaded class at block 400, the JIT compiler remains at block 400. On the other hand, if the JIT complier 114 determines that a new class has been loaded (block 400), the JIT compiler 114 executes an escape analysis of the whole program currently being executed, including the newly loaded class (block 402). The escape analysis may be implemented using any desired technique to identify objects that escape a thread (i.e., objects that are simultaneously accessible by more than one execution thread).

Following the escape analysis (block 402), the JIT compiler 114 determines if assumptions made during an initial whole program analysis prior to loading of the new class (block 400) remain valid (block 404). In other words, the JIT compiler 114 determines if the escape analysis (block 402) has determined that the newly loaded class has changed the behavior of the program so that multiple execution threads now have access to an object that was previously thread safe (i.e., accessed by only one execution thread at a time and therefore did not escape its current execution thread) and is currently not thread safe. In particular, a newly loaded class may result in the invalidation of a decision by an earlier escape analysis and optimization routine to remove unnecessary synchronization statements associated with a call site. The desynchronization performed during the earlier escape analysis is usually based on an assumption that one or more objects would remain thread safe. For example, assumptions made during an initial escape analysis performed on the code shown in FIG. 2 would be invalidated upon loading of the new class (i.e., Class2) defined within the code shown in FIG. 3.

In any event, if the JIT compiler 114 determines that the assumption(s) made during a previous escape analysis are no longer valid (e.g., one or more objects are no longer thread safe and may require resynchronization), the JIT compiler 114 identifies the call sites that are impacted or affected as a result of the now incorrect assumptions (block 406). After the affected call sites have been identified (block 406), the SIT compiler 114 restores synchronization to each of those sites (block 408) as described in greater detail in connection with FIG. 5 below.

Figure 5:
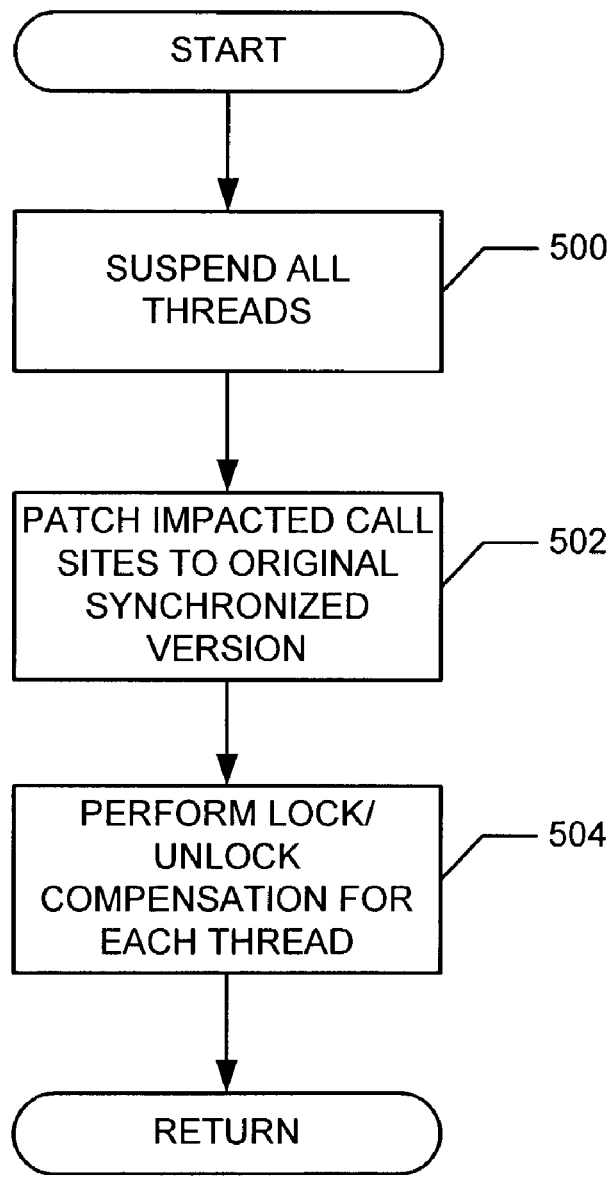
FIG. 5 is a more detailed flow diagram of an example manner in which the just-in-time complier shown in FIG. 1 may be configured to restore synchronization to impacted call sites.

FIG. 5 is a more detailed flow diagram depicting an example manner in which the JIT compiler 114 may be configured to restore synchronization to impacted call sites (block 408 of FIG. 4). First, the JIT compiler 114 suspends all currently active execution threads (block 500). Suspending execution threads in this manner guarantees that the patching and lock/unlock compensation performed as described below call be carried out in a safe manner (i.e., without corrupting a currently executing process). Further, because in practice dynamic loading of new classes is a relatively infrequent activity during runtime, the overhead (i.e., the time delay) associated with a complete suspension of all thread activity has a substantially negligible affect on overall productivity.

After the currently executing threads have been suspended (block 500), the JIT compiler 114 patches the impacted call sites back to their original synchronized versions (block 502). For example, in the case where target code addresses have been changed to refer to a desynchronized version of a method, the target code addresses can be changed back (i.e., patched) to the original target call addresses.

Following the patching (block 502), the JIT compiler 114 performs lock/unlock compensation for each suspended thread as required (block 504). Lock/unlock compensation is required in cases where one or more threads have been suspended subsequent to a call to unsynchronized code made prior to the patching (block 502) and before returning to the calling program. In those cases, lifting the thread activity suspension immediately following patching (block 502) permits the JIT compiler 114 to call a synchronized version of a method while the already started (i.e., started prior to the suspension at block 500) unsynchronized version of that same method continues to execute. As a result, the object(s) associated with that method may be accessed by two execution threads at one time, which could result in an unsafe condition for one or more resources.

The manner in which lock/unlock compensation is used may be understood with reference to the example code shown in FIGS. 2 and 3. For instance, if the JIT compiler 114 determines that, after Class2 has been loaded, the removal of synchronization at call site A is no longer valid (i.e., the escape analysis at block 402 of FIG. 4 has identified one or more objects that escape their execution threads), the JIT compiler 114 performs a resynchronization (i.e., restores synchronization to) call site A (block 408 of FIG. 4). If when performing lock/unlock compensation (block 504 of FIG. 5) the JIT compiler 114 determines that a first execution thread is currently associated with an active call to an unsynchronized version of "foo," lock/unlock compensation is required. In particular, if the first thread begins to execute "global. do_nothing(this)" at the same time that "global" becomes an instance of Class2, which assigns "obj" to "global" via the "do_nothing" method, the second thread can simultaneously execute "global.foo( )." As a result, the JIT compiler 114 may be attempting to execute both the synchronized and unsynchronized versions of "foo" on the same "obj," thereby violating synchronization semantics and creating an unsafe shared resource condition.

FIG. 6 is example pseudo-code depicting one manner in which the JIT compiler 114 shown in FIG. 1 may be configured to perform lock/unlock compensation for each thread associated with an impacted call site (block 504 of FIG. 5). In general, the example method depicted in FIG. 6 walks all the stack frames (i.e., the frames associated with currently active threads) from the stack top to the stack bottom. More specifically, the example method depicted in FIG. 6 maintains the correct synchronization semantics for each impacted site "<x, y>" (i.e., each call site for which synchronization must be restored) by re-executing a lock operation for z, which is the callee of "<x,y>" and which is the last frame on the stack (i.e., is active on the stack). In the case that z is a static method, the lock operation is performed on the class object. On the other hand, if z is an instance method (i.e., involves a virtual call), the JIT compiler 114 locates the object on which the lock operation is to be performed using any desired technique.

The function "compensate_lock_unlock( )" may be used to perform a lock operation to maintain a proper lock sequence. Additionally, this function also ensures that the proper unlock sequence is executed. For example, in the case where the code being processed by the JIT compiler 114 is JAVA-based, the lock and unlock operations must be paired correctly to carry out a synchronized method. In particular, there are two places where unlocking objects must be executed, upon exit of a synchronized method and during destructive unwinding of a synchronized method during exception handling.

The example method depicted in FIG. 6 enables the JIT compiler 114 to compensate only those portions of code that are affected by the newly added class and leaves those portions of code that are unaffected by the newly loaded class alone. In other words, simply patching the epilog code of the unsynchronized version of a method may de-optimize the code more than necessary because the runtime environment may require (or may be able to use without introducing contentions) a de-synchronized version of the method for other call sites that are unaffected by the newly loaded class. Specifically, the escape analysis performed by the JIT compiler 114 may separately identify those call sites that are affected by a newly loaded class (i.e., call sites for which the original assumption that synchronization can be safely removed is no longer valid) and those call sites for which it is still safe to invoke a desynchronized version of the method.

FIG. 7 illustrates example JAVA-based code for which synchronization removal remains valid despite the dynamic loading of Class2 (FIG. 2). In particular, invocation of the unsynchronized "foo" at call site B remains valid in the event that Class2 is newly loaded because the escape analysis determines that the type of "obj" is not of the type Class2.

Figure 8:
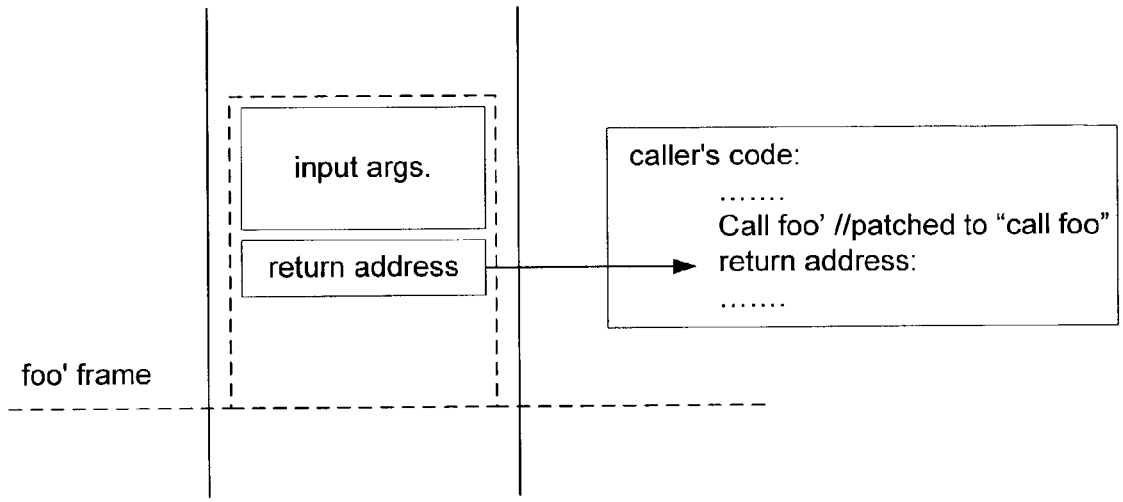
FIGS. 8 and 9 diagrammatically depict an example manner in which the just-in-time compiler shown in FIG. 1 may be configured to perform an unlock compensation operation.
Figure 9:
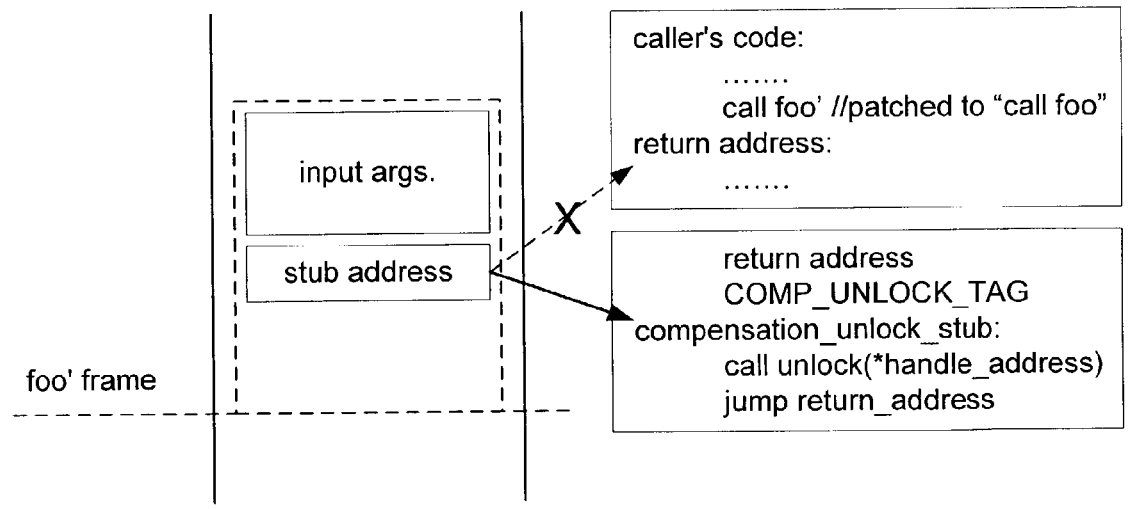

FIGS. 8 and 9 depict an example manner in which the compensate_lock_unlock method shown in the example pseudo code of FIG. 6 may be performed. In general, the compensate_lock_unlock function enables the JIT compiler 114 to redirect or "hijack" the return address at the bottom of a stack frame associated with an unsynchronized method currently being executed to stub code that executes a proper unlock operation. For the example shown in FIG. 8, the SIT compiler 114 identifies the location of the return address of an unsynchronized method "foo'" for which an unlock operation needs to be performed. As depicted in FIG. 9, the JIT compiler 114 replaces the return address in the stack frame of the unsynchronized method foo' with the address of the stub code. Thus, when the execution of the unsynchronized method foo' is complete, control is transferred to the appropriate stub code. In turn, the stub code executes the needed unlock operation and enables the JIT compiler 114 to jump back to the original return address. The stub code includes a hard-coded handle address, which represents the real address of the object for which an unlock operation needs to be performed.

FIG. 10 is example pseudo code depicting one manner in which the cookie COMP_UNLOCK_TAG may be used in conjunction with the example technique depicted in FIGS. 5 and 9 to recover a return address in a stack unwinding context. In a stack unwinding context, the runtime environment (e.g., a virtual machine) typically relies on the return address to find the next frame within the stack. For example, the well-known Open Runtime Platform (ORP) stores the starting and ending addresses of each method in a lookup table. Thus, given a code address, the virtual machine can find the method that contains the code address via the lookup table. However, redirecting or hijacking the return address as described in connection with FIGS. 8 and 9 above causes the lookup to fail to find the proper next frame.

The pseudo code shown in FIG. 10 includes the cookie COMP_UNLOCK_TAG, which indicates that the code adjacent to this tag is the compensation unlock stub code. As depicted in FIG. 9, the real return address and the COMP_UNLOCK_TAG are bundled together immediately prior to the stub code. As a result, if the SIT compiler 114 fails to find the associated method in the lookup table, the JIT compiler 114 checks if the word adjacent to it is the cookie COMP_

UNLOCK_TAG. If the cookie is found, the JIT complier 114 returns the real return address, which immediately precedes the cookie. The cookie COMP_UNLOCK_TAG is defined to be an illegal code sequence so that the JIT compiler 114 does not confuse the cookie with compiled code.

In the case of destructive stack unwinding process, the JIT compiler 114 compensates for the missing unlock operation by identifying the currently active stack frame via the COMP_ UNLOCK_TAG cookie as described in connection with FIG. 10 above, extracting the real object reference from the handle address contained in the stub code and performing the unlock operation oil the object.

While the lock/unlock compensation is described by way of example above as being used in connection with method or calls, those having ordinary skill in the art will readily appreciate that the techniques and apparatus described herein call be easily adapted to for use with block of code to accomplish similar or identical results.

Figure 11:
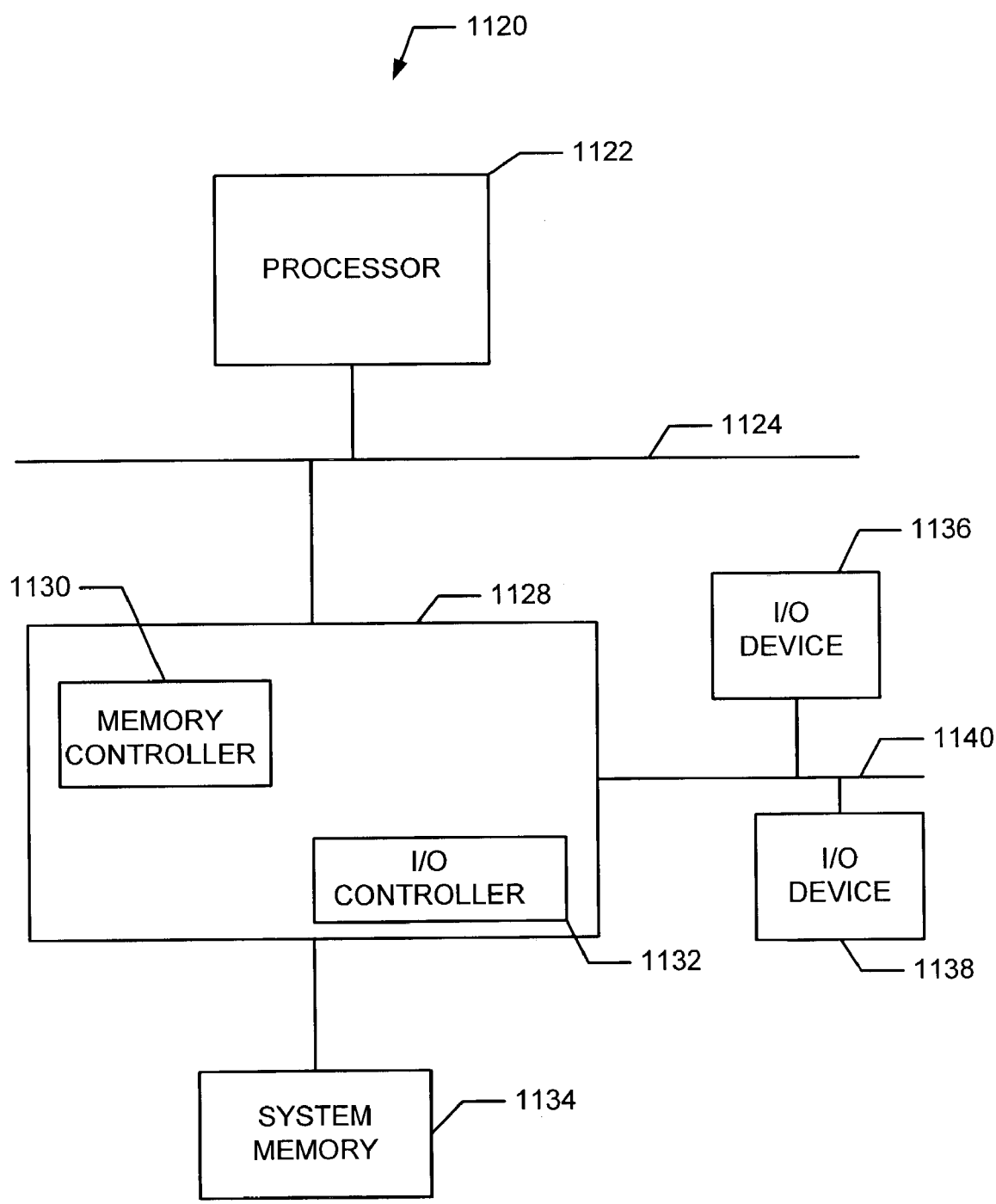
FIG. 11 is an example processor system that may be used to implement the apparatus and methods described herein.

FIG. 11 is a block diagram of an example processor system 1120 that may be used to implement the apparatus and methods described herein. For example, the methods described herein may be implemented as instructions stored on a memory and executed by a processor coupled to the memory. As shown in FIG. 11, the processor system 1120 includes a processor 1122 that is coupled to an interconnection bus or network 1124. The processor 1122 may be any suitable processor, processing unit or microprocessor such as, for example, a processor from the Intel Itanium® family, Intel X-Scale® family, the Intel Pentium® family, etc. Although not shown in FIG. 11, the system 1120 may be a multi-processor system and, thus, may include one or more additional processors that are identical or similar to the processor 1122 and which are coupled to the interconnection bus or network 1124.

The processor 1122 of FIG. 11 is coupled to a chipset 112S, which includes a memory controller 1130 and an input/output (I/O) controller 1132. As is well known, a chipset typically provides I/O and memory management functions as well as a plurality of general purpose and/or special purpose registers, timers, etc. that are accessible or used by one or more processors coupled to the chipset. The memory controller 1130 performs functions that enable the processor 1122 (or processors if there are multiple processors) to access a system memory 1134, which may include any desired type of volatile memory such as, for example, static random access memory (SRAM), dynamic random access memory (DRAM), etc. The I/O controller 1132 performs functions that enable the processor 1122 to communicate with peripheral input/output (I/O) devices 1136 and 1138 via an I/O bus 1140. The I/O devices 1136 and 1138 may be any desired type of I/O device such as, for example, a keyboard, a video display or monitor, a mouse, etc. While the memory controller 1130 and the I/O controller 1132 are depicted in FIG. 11 as separate functional blocks within the chipset 1128, the functions performed by these blocks may be integrated within a single semiconductor circuit or may be implemented using two or more separate integrated circuits.

Although certain methods, apparatus and articles of manufacture have been described herein, the scope of coverage of this patent is not limited thereto. To the contrary, this patent covers all methods, apparatus and articles of manufacture fairly falling within the scope of the appended claims either literally or under the doctrine of equivalents.

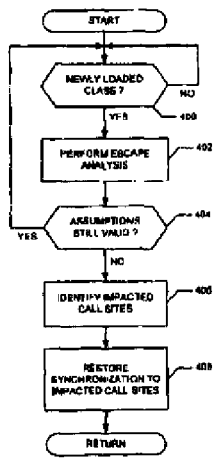

What is claimed is:

1. A method of restoring synchronization to program code comprising:
   determining if a class object has been dynamically loaded;
   determining if the class object was desynchronized;
   determining if the desynchronized class object includes a runtime contention;
   restoring synchronization to at least a portion of the program code via replacing the at least a portion of the program code with an original portion of the class object, restoring synchronization further comprising:
   performing lock/unlock compensation for an execution thread associated with the at least the portion of the program code; and
   suspending the execution thread prior to performing lock/unlock compensation for the execution thread.

2. A method as defined in claim 1, wherein the runtime contention is associated with at least one object that is accessible to only one execution thread at a particular time.

3. A method as defined in claim 1, wherein the program code is based on a dynamic programming language.

4. A method as defined in claim 3, wherein the dynamic programming language is Java.

5. A method as defined in claim 1, wherein the at least the portion of the program code is a call site.

6. A method as defined in claim 1, further including patching a call site associated with the execution thread prior to performing lock/unlock compensation for the execution thread.

7. A method as defined in claim 1, wherein performing lock/unlock compensation for the execution thread includes using one of a tag or a cookie to change an address associated with the program code to a stub code address.

8. A method as defined in claim 7, further including executing stub code associated with the stub code address to unlock the program code.

9. A method as defined in claim 1, wherein determining if the desynchronized class object includes a runtime contention further comprises detecting that the class object changes program code behavior.

10. A method as defined in claim 9, wherein detecting that the class object changes program code behavior comprises detecting the class object is accessible to multiple threads.

11. A system for restoring synchronization to program code comprising:
   a memory; and
   a processor coupled to the memory and capable of:
   determining if a class object has been dynamically loaded;
   determining if the class object was desynchronized;
   determining if the desynchronized class object includes a runtime contention;
   restoring synchronization to at least a portion of the program code via replacing at least a portion of the program code with an original portion of the class object, restoring synchronization further comprising:
   performing lock/unlock compensation for an execution thread associated with the at least the portion of the program code; and
   suspending the execution thread prior to performing lock/unlock compensation for the execution thread.

12. A system as defined in claim 11, wherein the runtime contention is associated with at least one object that is accessible to only one execution thread at a particular time.

13. A system as defined in claim 11, wherein the program code is based on a dynamic programming language.

14. A system as defined in claim 13, wherein the dynamic programming language is Java.

15. A system as defined in claim 11, wherein the at least the portion of the program code is a call site.

16. A system as defined in claim 11, wherein the processor is capable of patching a call site associated with the execution thread prior to performing lock/unlock compensation for the execution thread.

17. A system as defined in claim 11, wherein the processor is capable of performing lock/unlock compensation for the execution thread by using one of a tag or a cookie to change an address associated with the program code to a stub code address.

18. A system as defined in claim 17, wherein the processor is capable of executing stub code associated with the stub code address to unlock the program code.

19. A system as defined in claim 11, wherein determining if the desynchronized class object includes a runtime contention further comprises detecting that the class object changes program code behavior.

20. A system as defined in claim 19, wherein detecting that the class object changes program code behavior comprises detecting the class object is accessible to multiple threads.

21. A machine accessible medium having instructions stored thereon that, when executed, cause a machine to:
 determine if a class object has been dynamically loaded;
 determine if the class object was desynchronized;
 determine if the desynchronized class object includes a runtime contention;
 restore synchronization to at least a portion of the program code via replacing the at least a portion of the program code with an original portion of the class object, restoring synchronization further comprising:
 performing lock/unlock compensation for an execution thread associated with the at least the portion of the program code; and
 suspending the execution thread prior to performance of the lock/unlock compensation for the execution thread.

22. A machine accessible medium as defined in claim 21, wherein the runtime contention is associated with at least one object that is accessible to only one execution thread at a particular time.

23. A machine accessible medium as defined in claim 21, wherein the program code is based on a dynamic programming language.

24. A machine accessible medium as defined in claim 23, wherein the dynamic programming language is Java.

25. A machine accessible medium as defined in claim 21, wherein the at least the portion of the program code is a call site.

26. A machine accessible medium as defined in claim 21 having instructions stored thereon that, when executed, cause the machine to patch a call site associated with the execution thread prior to performance of the lock/unlock compensation for the execution thread.

27. A machine accessible medium as defined in claim 21 having instructions stored thereon that, when executed, cause the machine to perform lock/unlock compensation for the execution thread includes using one of a tag or a cookie to change an address associated with the program code to a stub code address.

28. A machine accessible medium as defined in claim 27 having instructions stored thereon that, when executed, cause the machine to execute stub code associated with the stub code address to unlock the program code.

29. A machine accessible medium as defined in claim 21 having instructions stored thereon that, when executed, cause the machine to detect that the class object changes program code behavior.

30. A machine accessible medium as defined in claim 29 having instructions stored thereon that, when executed, cause the machine to detect the class object is accessible to multiple threads.

31. A computer system having an operating system associated therewith, the computer system comprising:
 a runtime environment operatively coupled to the operating system;
 a just-in-time compiler operatively coupled to the runtime environment, wherein the just-in-time compiler is configured to:
 determine if a new class was previously desynchronized in response to receipt of the new class by the runtime environment;
 identify at least one call site associated with program code for which synchronization is to be restored;
 restore synchronization to the at least one call site via replacing the program code with an original portion of the new class, restoring synchronization further comprising:
 performing lock/unlock compensation for an execution thread associated with the at least one call site; and
 suspending the execution thread prior to performance of the lock/unlock compensation for the execution thread.

32. A computer system as defined in claim 31, wherein the runtime environment is based on a virtual machine.

33. A computer system as defined in claim 31, wherein the just-in-time compiler is configured to restore synchronization to the at least one call site by suspending at least one execution thread, patching the at least one call site to an original synchronized version and performing lock/unlock compensation for the at least one execution thread.

* * * * *

UNITED STATES PATENT AND TRADEMARK OFFICE
CERTIFICATE OF CORRECTION

PATENT NO. : 7,603,663 B2
APPLICATION NO. : 10/441357
DATED : October 13, 2009
INVENTOR(S) : Wu et al.

It is certified that error appears in the above-identified patent and that said Letters Patent is hereby corrected as shown below:

Dependent claim 33 should be deleted.

Signed and Sealed this

Eighth Day of December, 2009

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,603,663 B2 | Page 1 of 2 |
| APPLICATION NO. | : 10/441357 | |
| DATED | : October 13, 2009 | |
| INVENTOR(S) | : Wu et al. | |

It is certified that error appears in the above-identified patent and that said Letters Patent is hereby corrected as shown below:

Delete the title page and substitute therefore the attached title page showing the correct number of claims in printed patent.

Column 12, lines 45-50, Dependent claim 33 should be deleted.

This certificate supersedes the Certificate of Correction issued December 8, 2009.

Signed and Sealed this

Twenty-sixth Day of January, 2010

David J. Kappos
*Director of the United States Patent and Trademark Office*

(12) United States Patent
Wu et al.

(10) Patent No.: US 7,603,663 B2
(45) Date of Patent: Oct. 13, 2009

(54) APPARATUS AND METHODS FOR RESTORING SYNCHRONIZATION TO OBJECT-ORIENTED SOFTWARE APPLICATIONS IN MANAGED RUNTIME ENVIRONMENTS

(75) Inventors: Gansha Wu, Beijing (CN); Guei-Yuan Lueh, San Jose, CA (US); Xiaohua Shi, Beijing (CN)

(73) Assignee: Intel Corporation, Santa Clara, CA (US)

( * ) Notice: Subject to any disclaimer, the term of this patent is extended or adjusted under 35 U.S.C. 154(b) by 595 days.

(21) Appl. No.: 10/441,357

(22) Filed: May 20, 2003

(65) Prior Publication Data

US 2004/0237073 A1 Nov. 25, 2004

(51) Int. Cl.
*G06F 9/45* (2006.01)
*G06F 9/44* (2006.01)
(52) U.S. Cl. .................. 717/151; 717/159; 717/166
(58) Field of Classification Search .............. 717/135, 717/166
See application file for complete search history.

(56) References Cited

U.S. PATENT DOCUMENTS

| | | | |
|---|---|---|---|
| 6,671,707 B1 * | 12/2003 | Hudson et al. | 707/206 |
| 7,058,929 B2 * | 6/2006 | Charnell et al. | 717/135 |
| 2002/0049865 A1 * | 4/2002 | Charnell et al. | 709/315 |

OTHER PUBLICATIONS

"Escape analysis for object-oriented languages: application to Java", B. Blanchet, Dec. 1999, pp. 1-15. Online retrieved at <http://delivery.acm.org/10.1145/330000/320387/p20-blanchet.pdf>.*

"Effective synchronization removal for Java", E. Ruf, Dec. 2000, pp. 208-218. Online retrieved at <http://delivery.acm.org/10.1145/350000/349327/p208-ruf.pdf>.*

Whaley, J; Rinard, M. "Compositional Pointer and Escape Analysis for Java Programs." Proceedings of the 14th Annual ACM SIGPLAN Conference on Object-Oriented Programming Systems, Languages, and Applications. Denver, CO, Nov. 1999. pp. 187-206.

Bogda, J; Holzle, U. "Removing Unnecessary Synchronization in Java." Proceedings of the 14th Annual ACM SIGPLAN Conference on Object-Oriented Programming Systems, Languages, and Applications. Denver, CO, Nov. 1999. pp. 35-46.

Ruf, E. "Effective Synchronization Removal for Java." ACM SIGPLAN Conference on Programming Language Design and Implementation (PLDI'2000). Vancouver, British Columbia, Canada, 2000. pp. 208-218.

Choi, J; Gupta, M; Serrano, M; Sreedhar, V; Midkiff, S. "Escape Analysis for Java." Proceedings of the 1999 ACM SIGPLAN conference on Object-oriented programming, systems, languages, and applications. Denver, CO, Nov. 1999. pp. 1-19.

*Written Opinion of the International Searching Authority*, Dec. 10, 2004, 6 sheets.

*International Search Report*, Dec. 10, 2004, 3 sheets.

* cited by examiner

*Primary Examiner*—Tuan Q Dam
*Assistant Examiner*—Thuy Dao
(74) *Attorney, Agent, or Firm*—Hanley, Flight & Zimmerman, LLC

(57) ABSTRACT

An example apparatus and method described herein involves determining if a class object has been dynamically loaded, performing an escape analysis on the program code and determining if assumptions made during an initial escape analysis are valid. Additionally, the example apparatus and method restore synchronization to at least a portion of the program code affected by loading of the class object if the assumptions made during the initial escape analysis are no longer valid.

32 Claims, 8 Drawing Sheets